Jan. 14, 1969  N. A. BEHRENS  3,421,740
MATERIAL MIXER
Filed Oct. 31, 1966  Sheet 1 of 2
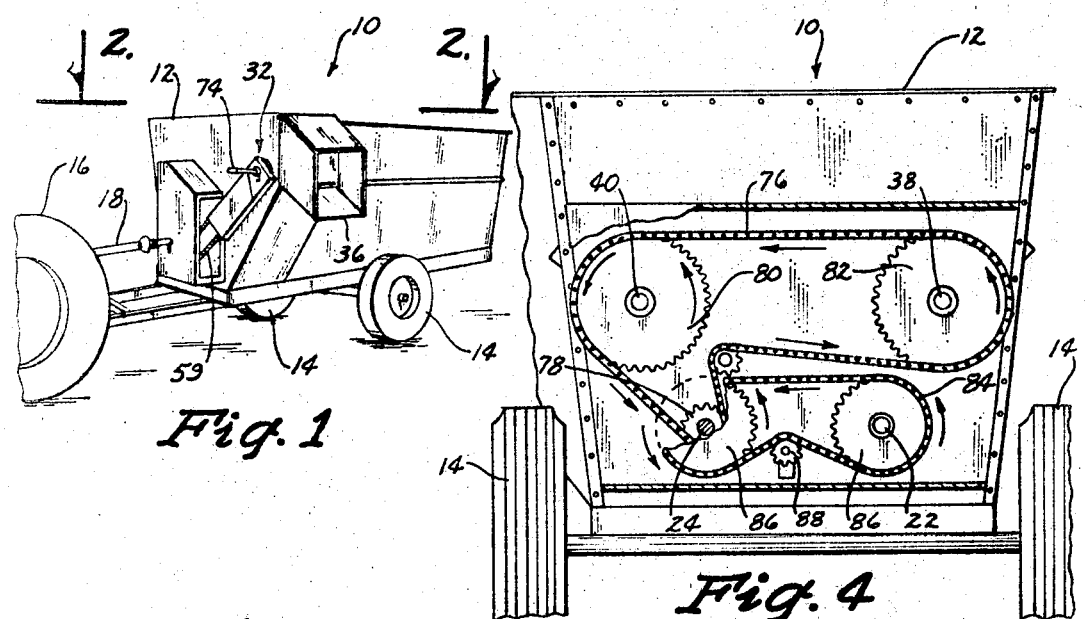
Fig. 1
Fig. 4
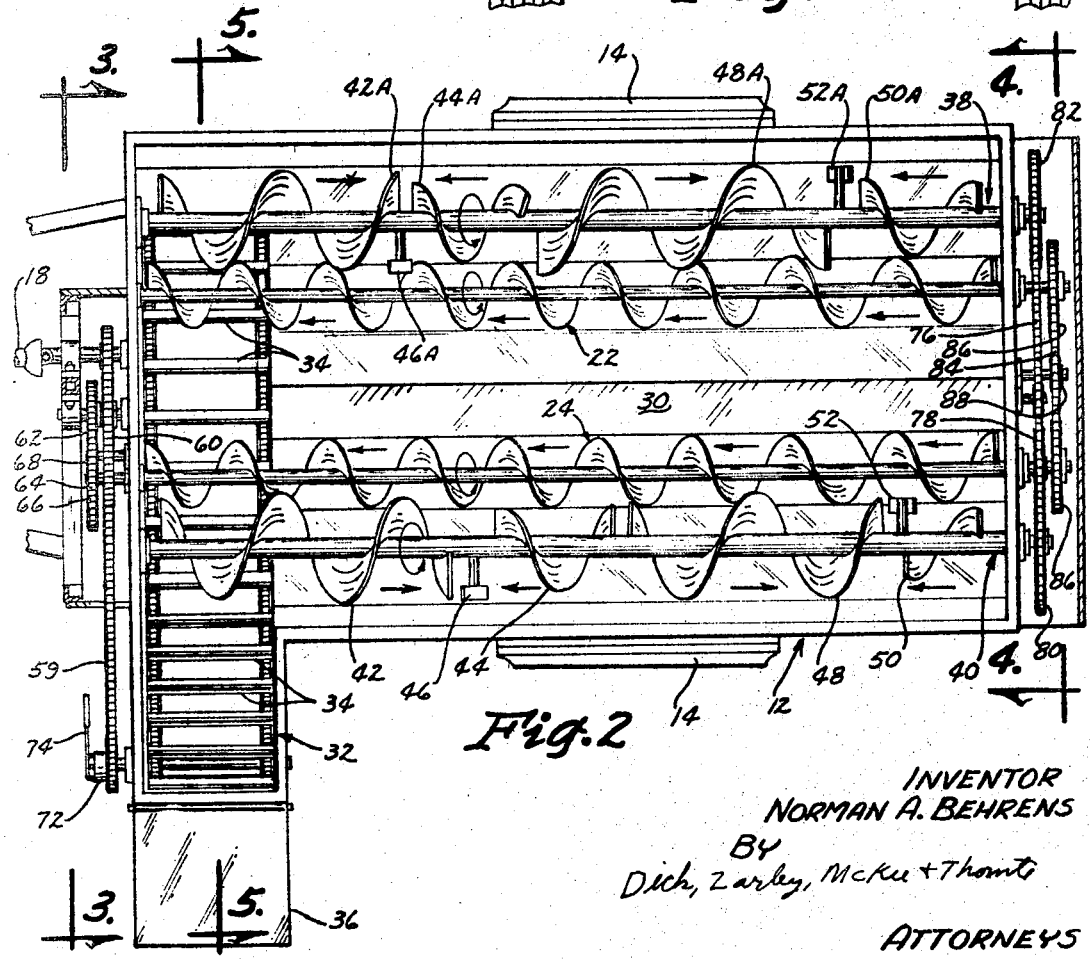
Fig. 2
INVENTOR
NORMAN A. BEHRENS
BY
Dick, Zarley, McKee & Thomte
ATTORNEYS

United States Patent Office 3,421,740
Patented Jan. 14, 1969

3,421,740
MATERIAL MIXER
Norman A. Behrens, R.R. 1, Columbus, Nebr. 68601
Filed Oct. 31, 1966, Ser. No. 590,570
U.S. Cl. 259—41                                    12 Claims
Int. Cl. B01f 15/02; B01f 7/08; B01f 5/12

ABSTRACT OF THE DISCLOSURE

A device including an elongated container having a mixing chamber with an unloading means on one end in communication with the mixing chamber, a first conveyor adjacent the bottom of the chamber for moving material towards the unloading means, a second conveyor positioned in the chamber above the first conveyor, the second conveyor having the first conveyor portion adjacent the one end of the chamber for moving material rearwardly within the chamber and the second conveyor portion opposing the first conveyor portion for moving material forwardly within the chamber and thereby causing a boiling and tumbling action between the first and second conveyor portions.

---

It is frequently desirable to mix with farm grains protein supplements or the like and therefore when the grains are moved from the storage bins to the feeding area it is a great time and money saver if the mixing can be accomplished in the hauling vehicle. It may be appreciated that it can be desirable to mix other materials moving them from storage to the point of usage.

This invention further involves the use of augers as conveyors and providing a third conveyor portion which is positioned rearwardly of the second conveyor portion for moving material rearwardly in the chamber and a fourth conveyor portion positioned rearwardly of the third conveyor portion in the chamber for moving material forwardly in opposition to the action of the third conveyor portion thereby causing a boiling and tumbling action between the third and fourth conveyor portions.

Still further, this invention involves first and third auger conveyors adjacent the bottom of a material chamber for moving material towards the unloading end and second and fourth conveyors above the bottom conveyors wherein each of the second and fourth conveyors have auger sections operating to move material to two separate spaced apart areas along the length of the material chamber whereby the material in the material chamber moves generally along the bottom of the chamber then upwardly along the front end and thence rearwardly towards the rear end and downwardly to the bottom conveyors and back again towards the front end where if desired the material may be discharged by operation of a material unloading conveyor. Further agitation may be accomplished in the areas of the boiling and tumbling action by the use of a paddle member on the auger where the adjacent opposing auger sections meet.

These and other purposes of this invention will be apparent to those skilled in the art.

This invention consists in the construction, arrangements, and combination of the various parts of the device, whereby the purposes contemplated are attained as hereinafter more fully set forth, specifically pointed out in the claims, and illustrated in the accompanying drawings in which:

FIG. 1 is a fragmentary perspective view of a material mixer wagon having an unloading conveyor;

FIG. 2 is a top plan view taken along line 2—2 in FIG. 1 of the material mixer wagon;

FIG. 4 is a rear end cross-sectional view taken along line 4—4 in FIG. 2; and

Figure 3:
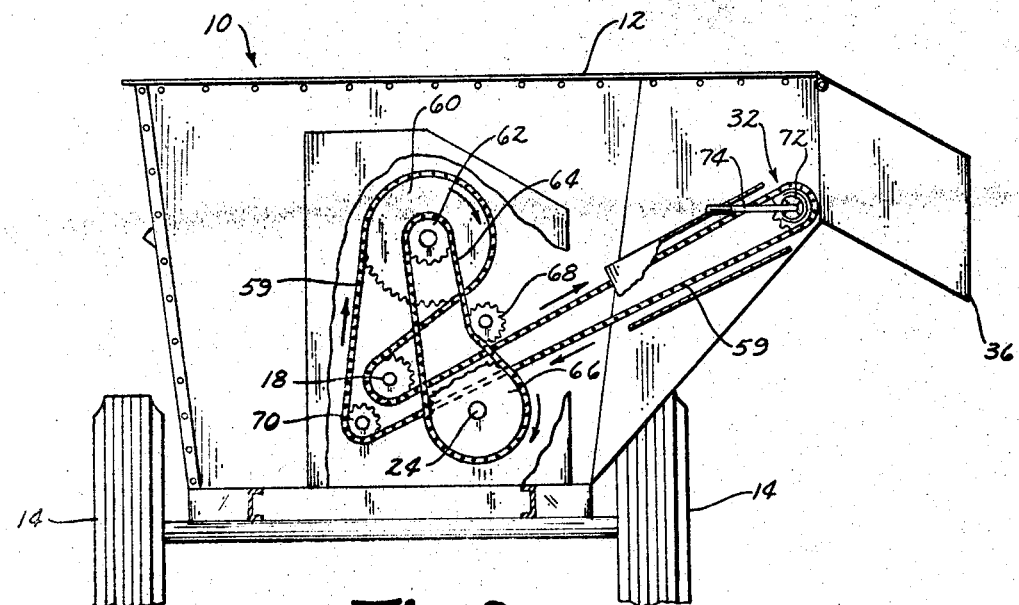
FIG. 3 is a front end elevation view taken along line 3—3 in FIG. 2.

The material mixer of this invention is referred to in FIG. 1 by the reference numeral 10 and is shown to include a wagonbox 12 mounted on ground engaging support wheels 14 and being drawn by a tractor 16. Power is supplied to the material mixer through a power take-off shaft 18.

Figure 5:
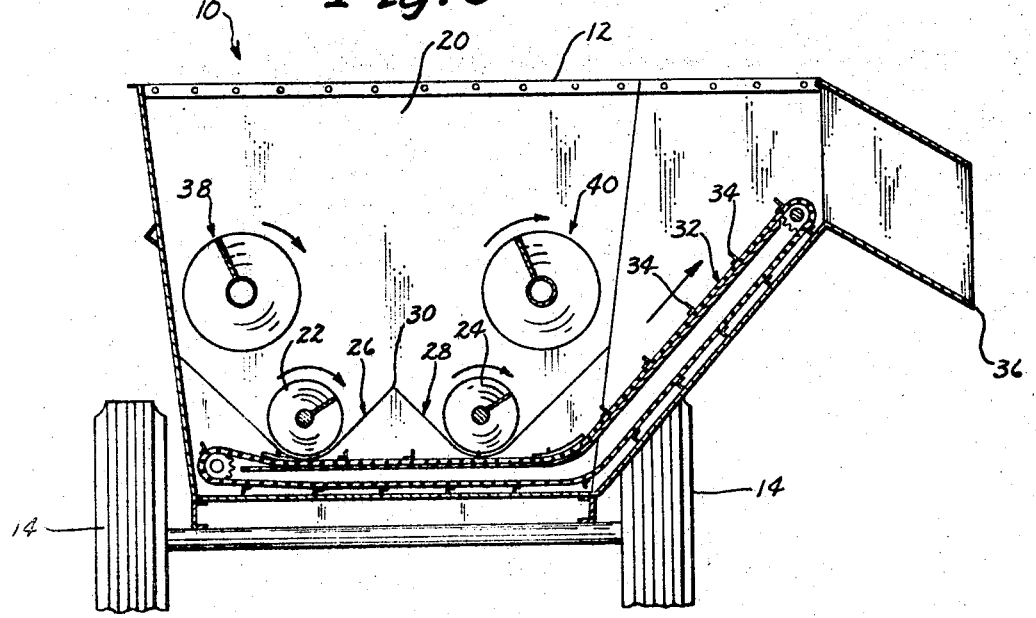
FIG. 5 is an elevational cross-sectional view taken along line 5—5 in FIG. 2.

Referring now to FIGS. 2 and 5, it is seen that a material chamber 20 is provided in the wagonbox 12 and that a pair of augers 22 and 24 are positioned in troughs 26 and 28 in the bottom of the chamber and extend the length of the wagonbox. An A-shaped in cross-section divider wall 30 separates the two troughs and augers and assures that all material is fed into the bottom augers 22 and 24. The conveyors 22 and 24 extend at their forward ends over a chain type unloading conveyor 32 having a series of flights 34 spaced along its length. The unloading conveyor 32 is in communication with a discharge spout 36 on the forward corner of the wagon 12.

The two conveyors 22 and 24 have spaced above them a second pair of conveyors 38 and 40. These conveyors are best seen in FIG. 2. The auger conveyor 40 has a forward auger section 42 for moving material rearwardly in opposition to an adjacent auger section 44 moving material forwardly. The second auger section 44 is smaller in diameter and thus has a smaller capacity for moving material. This auger section of course is assisted by the bottom augers 22 and 24 moving material forwardly in the chamber 20. Thus, the material being moved rearwardly by the auger section 42 and the material moved forwardly by the auger section 44 will meet at the adjacent ends of these auger sections and result in a boiling and tumbling action which will very effectively mix the material. A transversely extending paddle member 46 is provided on the shaft of the auger conveyor 40 between the auger sections 42 and 44 to provide further agitation to the material as it is boiled and tumbled.

A third auger section 48 similar in cross-sectional diameter to the auger section 42 is provided rearwardly of the auger section 44 and meets with a smaller auger section 50 which extends to the rear end of the wagonbox 12. The two auger sections 48 and 50 when operated move material in opposite directions as indicated by the arrows in FIG. 2 and thus cause a boiling and tumbling action similar to that of the augers 42 and 44. Also, a transversely extending paddle 52 is provided between the auger sections 48 and 50.

The auger conveyor 38 is similar in design to the auger conveyor 40 but has the juncture of the opposing auger conveyors 42A and 44A at a point spaced longitudinally from the corresponding point between auger conveyor sections 42 and 44. Similarly, the rear auger sections 48A and 50A which opposse each other meet at a point longitudinally spaced from the juncture of the auger sections 48 and 50 on the opposite side of the wagon. At each of the junctions between the auger sections on the auger conveyor 38 agitating paddlese 42A and 52A are provided similar to the agitating paddles 46 and 52 on the auger conveyor 40.

It is also seen by the arrows in FIG. 2 that all of the auger conveyors 22, 24 and 38 and 40 are turned in the same direction to facilitate feeding the unloading conveyor 32. Preferably, the lower forwardly moving auger conveyors 22 and 24 would have a 10 inch diameter while the larger auger conveyor sections 42, 42A, 48 and 48A have a 16 inch diameter. The smaller upper auger conveyor sections 44, 44A, 50 and 50A each have a 12 inch diameter.

As previously indicated, the auger conveyors are operated by the power take-off shaft 18 which, as seen in FIG. 3, is connected by a sprocket chain 59 to the outer conveyor 24 through a pair of gear reduction sprocket wheels 60 and 62 and a second chain drive 64. A sprocket wheel 66 is mounted on the shaft of the auger conveyor 24 and engages the sprocket chain 64 along with an idler sprocket 68. The unloading conveyor 32 is driven by the sprocket chain 59 which extends over an idler sprocket 70 and a sprocket 72 associated with an unloading conveyor clutch assembly 74 at the outer end of the unloading conveyor.

The power for operating the auger conveyors thus is transmitted to the rear end of the wagon 12 through the shaft of the auger conveyor 24 where it is seen in FIG. 4 it drives a sprocket chain 76 through a drive sprocket 78 over a sprocket 80 on the shaft of the auger conveyor 40 thence over a sprocket 82 on the shaft of the auger conveyor 38. A second sprocket chain 84 is connected to a second sprocket wheel 86 on the shaft of the auger conveyor 24 and drives the auger conveyor 22 through a sprocket 86. An idler sprocket 88 maintains the chain 84 in a taut condition.

In operation it is then seen that the material in the wagon may be continuously mixed and selectively unloaded as desired by operation of the unloading conveyor 32. The material in the chamber 20 is moved forwardly by the two bottom conveyors 22 and 24 then upwardly to the larger in diameter conveyor sections 42 and 44A which move it back to the area of the smaller auger sections 44 and 44A and the paddles 46 and 46A whereupon a boiling and tumbling action in the material occurs. Some of the material will tumble back to the front and some to the next auger sections 48 and 48A which will move the material to another boiling point where it is again tumbled at the juncture of auger sections 48 and 50 and 48A and 50A. The material then falls into the bottom augers 22 and 24 which bring it forwardly again either to the top to augers 38 and 40 or for communication with the unloading conveyor 32. The staggering of the boiling and tumbling stations on opposite sides of the wagonbox serve to more effectively spread the mixing action over the area of the wagonbox chamber.

Some changes may be made in the construction and arrangement of my material mixer without departing from the real spirit and purpose of my invention, and it is my intention to cover by my claims any modified forms of structure or use of mechanical equivalents which may be reasonably included within their scope.

I claim:
1. A material mixer, comprising,
an elongated container having a mixing chamber,
an unloading means at one end of said chamber,
a first conveyor adjacent the bottom of said chamber for moving material forwardly towards said unloading means,
a second conveyor positioned in said chamber above said first conveyor, said second conveyor having a first portion adjacent said one end of said chamber for moving material rearwardly within said chamber, and a second portion opposing said first portion for moving material forwardly within said chamber thereby causing a boiling and tumbling action between said first and second portions,
said first conveyor portion having a larger transfer capability per unit length than either said first conveyor or said second conveyor portion.

2. The structure of claim 1 wherein said second conveyor includes a third conveyor portion positioned rearwardly of said second portion for moving material rearwardly in said chamber.

3. The structure of claim 2 wherein said second conveyor includes a fourth conveyor portion positioned rearwardly of said third conveyor portion in said chamber for moving material forwardly in opposition to the material being moved rearwardly by said third conveyor portion thereby causing a boiling and tumbling action between said third and fourth conveyor portions.

4. The structure of claim 3 wherein a rotating paddle member is included in said second conveyor between each of said first and second conveyor portions and said third and fourth conveyor portions for providing agitating action of the material in said chamber.

5. The structure of claim 4 wherein said first conveyor and said first, second, third and fourth portions of said second conveyor are further defined as augers.

6. The structure of claim 1 and a third conveyor is positioned adjacent said first conveyor and adjacent the bottom of said chamber for moving material towards said unloading means, and a fourth conveyor is positioned adjacent said second conveyor and above said third conveyor,
said fourth conveyor having a first portion adjacent said one end of said chamber for moving material rearwardly within said chamber, and a second portion opposing said first portion for moving material forwardly within said chamber thereby causing a boiling and tumbling action between said first and second portions.

7. The structure of claim 6 wherein said fourth conveyor includes a third conveyor portion positioned rearwardly of said second portion for moving material rearwardly in said chamber, and a fourth conveyor portion positioned rearwardly of said third conveyor portion in said chamber for moving material forwardly in opposition to the action of said third conveyor portion thereby causing a boiling and tumbling action between said third and fourth conveyor portions in said fourth conveyor.

8. The structure of claim 7 wherein said first and third conveyors and said first, second, third and fourth portions of said second and fourth conveyors are further defined as augers.

9. The structure of claim 8 wherein said bottom of said chamber is formed with auger troughs for said first and third conveyors and an A-shaped in cross-section divider wall is formed between said first and third conveyors.

10. The structure of claim 8 wherein said unloading means is further defined as a conveyor extending into said chamber under the forward ends of said first and third conveyors and having an outer end positioned for communication with the exterior of said chamber.

11. The structure of claim 8 wherein said first and third conveyor portions of said second and fourth conveyors have larger transfer capability per unit length than either of said first and third conveyors or said second and fourth conveyor portions of said second and fourth conveyors.

12. The structure of claim 8 wherein said first and second conveyor portions on said second and fourth conveyors meet at points longitudinally spaced apart, and said third and fourth conveyor portions of said second and fourth conveyors meet at points longitudinally spaced apart.

References Cited

UNITED STATES PATENTS

| | | | |
|---|---|---|---|
| 946,475 | 1/1910 | Talley | 259—41 |
| 1,977,515 | 10/1934 | Klippel. | |
| 2,676,002 | 4/1954 | Wolfe | 259—41 |
| 2,947,524 | 8/1960 | Bridges | 259—6 |
| 2,991,870 | 7/1961 | Griffith et al. | 259—6 XR |
| 3,071,352 | 1/1963 | McIntyre | 259—6 XR |
| 3,265,227 | 8/1966 | Vratil et al. | |

FOREIGN PATENTS 673,841   11/1963   Canada.

WALTER A. SCHEEL, Primary Examiner.
JOHN M. BELL, Assistant Examiner.

U.S. Cl. X.R.
259—6, 97